Nov. 9, 1954  W. H. TANKE ET AL  2,693,747
TRACTOR MOUNTED IMPLEMENT SUPPORT AND IMPLEMENT
Filed March 31, 1948  6 Sheets-Sheet 1

Fig. 1

Inventors
Willard H. Tanke
August G. Buhr
by Kimball S. Wyman
Attorney

Nov. 9, 1954    W. H. TANKE ET AL    2,693,747
TRACTOR MOUNTED IMPLEMENT SUPPORT AND IMPLEMENT
Filed March 31, 1948    6 Sheets-Sheet 2

Nov. 9, 1954 W. H. TANKE ET AL 2,693,747
TRACTOR MOUNTED IMPLEMENT SUPPORT AND IMPLEMENT
Filed March 31, 1948 6 Sheets-Sheet 3

Fig. 3

Inventors
Willard H. Tanke
August G. Buhr
by Kimball L. Wyman
Attorney

Nov. 9, 1954  W. H. TANKE ET AL  2,693,747
TRACTOR MOUNTED IMPLEMENT SUPPORT AND IMPLEMENT
Filed March 31, 1948  6 Sheets-Sheet 5

Inventors
Willard H. Tanke
August G. Buhr
by Kimball A. Wyman
Attorney

United States Patent Office 2,693,747
Patented Nov. 9, 1954

2,693,747

TRACTOR MOUNTED IMPLEMENT SUPPORT AND IMPLEMENT

Willard H. Tanke and August G. Buhr, La Crosse, Wis., assignors to Allis-Chalmers Manufacturing Company, Milwaukee, Wis., a corporation of Delaware Application March 31, 1948, Serial No. 18,246

8 Claims. (Cl. 97—47.43)

This invention relates generally to an implement attachable to or mounted on a suitable draft vehicle, hereinafter referred to as a tractor, and is more specifically directed toward a construction and combination of parts attachable to or carried by a tractor for interchangeably mounting a variety of implements. In addition, the present invention also contemplates the provision of an implement attachment and/or a draft vehicle implement combination including one or more tool carrying rigs or gangs incorporating features of particular advantage in effecting complete cultivation of row crops.

Vegetable farming usually involves raising a variety of crops planted in closely spaced rows on relatively flat land or on the top surface of flat beds separated by a ditch or furrow therebetween. And in order to obtain the most efficient use of the available land, different crops should be planted in rows spaced apart distances conforming with the nature and requirement of each crop. For example, some crops require a row spacing of only ten inches whereas other crops may require a row spacing of twelve, fourteen, or more inches. Consequently, the mechanical performance of operations such as planting and cultivating vegetable crops necessitates a design and construction of apparatus effective to plant each crop in straight rows spaced apart uniform distances as determined by the nature of the particular crop and effective to obtain complete cultivation of all such crops.

More particularly the mechanical planting and cultivation of such crops necessitates the use of a light weight wheel supported wide axle tractor having front and rear wheels laterally adjustable to conform with different row spacings and thereby straddle several rows or one or more beds with the front and rear wheels disposed in longitudinal alignment to travel between adjacent rows or in the furrows between adjacent beds. Light weight is an extremely important factor in that the tire width of the wheels must be such as to afford an adequate support for the tractor and yet be narrow enough to travel between adjacent closely spaced rows without damaging the plants therein. Moreover, the design and construction of the tractor and of the implement supports carried thereby should be such as to afford adequate ground clearance for operatively mounting implements directly beneath the tractor when the latter is straddling one or more beds and such as to afford an operator seated on the tractor a practically unrestricted close range view of the implements and plant rows underlying the tractor as well as those disposed laterally thereof. And in this connection, best operating results are obtained when the implements are positioned in the area between and directly behind the front dirigible wheels as the implements closely follow the steering movements of these wheels and as the operator's line of vision including the implements is sufficiently forward to obtain excellent steerability. In addition, different crops, the development stage of a crop, and the condition of the soil frequently necessitate the use of different implements and/or tools in order to obtain best results. And it is, therefore, highly desirable that the tractor carried implement supports and the implements attachable to or mounted thereon be designed and constructed for coaction with each other and with associated tractor parts so that the implements and/or tools, irrespective of type, may be readily raised to a height above the ground sufficient for all practical purposes and may be readily interchanged and/or adjusted, as desired.

In the mechanical cultivation of row crops and more especially vegetable crops planted in rows spaced apart a matter of ten or more inches, complete cultivation necessitates operating with tools set close to the plant rows and keeping the depth to which these tools penetrate into the ground extremely shallow at all times, often not more than one fourth of an inch. This manner of operation necessitates affording the operator of the draft vehicle a practically unrestricted, close range view of all of the tool gangs and is more readily accomplished with the aid of means for readily varying the line of rig draft so that the tools mounted thereon have a tendency to enter into or ride out of the ground as desired for particular soil conditions. In addition, an efficient utilization of implements of this type necessitates, particularly when simultaneously raising a variety of vegetable crops planted in rows of different width or spacing, that the tool rigs be readily shiftable on the implement to conform with the row width of different crops and that the implement be readily attachable and removable as a unit so that if desired a separate implement may be employed for each row width thereby eliminating a frequent shifting of tool rigs and/or of the tools mounted thereon.

Attainment of the mode of operation and the efficient utilization of tools and implement as aforementioned involves numerous features not present in the design and construction of the implements and/or tractor implement combinations heretofore known and used. And in operating these known implements, it is customary, usually because of the operator's inability to simultaneously view all tool rigs at close range and/or to maintain a uniform shallow depth of tool penetration, to cultivate deeper than necessary for proper weed destruction in order to maintain the tools in the ground at all times which in turn necessitates keeping the tools farther away from the plants in order to avoid damaging the roots thereof. This results in incomplete cultivation which must be followed up by the tedious and time consuming procedure of hand weeding. In addition it has heretofore been necessary, because of a lack of suitable mechanical equipment, to complete or perform other essential operations by hand or by manually propelled tools as distinguished from tractor propelled tools or implements. Consequently, considerable time is required to complete any such operation and as a result labor costs are invariably too high and a lack of labor or time frequently results in crop damage or loss from inability to plant and/or care for a crop at the most opportune time.

It is therefore an object of this invention to provide a tractor with a depending implement support means incorporating parts constructed and combined for coaction in a novel and improved manner affording material advantages as to the position and arrangement of implements carried thereby and/or as to the interchangeability of such implements.

Another object of the present invention is to provide an improved tractor-implement combination including parts constructed and mounted for coaction so as to support and position an elongated rigid implement draft bar to extend transversely beneath the tractor, and if desired laterally beyond the opposite sides thereof, and so as to afford vertical movement of the support means and draft bar sufficient to operatively raise and lower implements disposed directly beneath the tractor.

Still another object of the present invention is to provide a tractor with an improved depending implement support means incorporating features effective to vertically adjustably support and position a flat and relatively thin rigid draft bar, rectangular in cross section, transversely beneath a forward portion of the tractor with its narrow sides generally normal to the line of vision of an operator seated on the tractor and looking forward and downward toward the ground between and directly behind the front wheels of the tractor.

Still another object of the present invention is to provide an improved tractor-implement combination comprising an underslung vertically adjustable implement having one or more parts disposed directly beneath the tractor and presenting at least one rear portion which is equal to or exceeds the height of the portion of the tractor carried support attached to a forward portion of the implement.

Still another object of this invention is to provide an improved tractor-implement combination including a plurality of underslung independent tool gangs mounted and arranged to afford the operator of the draft vehicle a practically unrestricted, close range view of all of the tool gangs and of the plant rows being cultivated thereby.

Still another object of the present invention is to provide an improved tractor-implement combination including one or more underslung tool frames constructed and arranged for coaction so as to maintain the depth of tool penetration uniform, and if desired extremely shallow, at all times.

Still another object of the present invention is to provide an improved tractor-implement combination including one or more underslung tool rigs constructed and mounted for vertical movement through means permitting all rigs to float or swing vertically relative to each other and permitting the forward portion of the draft vehicle to rise or fall in conformity with the usual variations in ground surface encountered by the front wheels thereof without materially affecting the floating movement of the tool rigs.

Still another object of the present invention is to provide a unitary implement structure adapted to be detachably secured to a vertically movable underslung support on a tractor and including one or more tool rigs attached to the tractor support for vertical movement relative thereto and relative to each other through means rendering a limited vertical adjustment of the underslung support effective to incline the line of rig draft passing through the tractor support either upward or downward relative to a horizontal plane passing through such support.

Still another object of the present invention is to provide an independent floating gang implement attachment for tractors including features of improvement as to the construction, combination, mounting, and/or adjustment of parts, all to the end of affording efficient utilization of the tools and implement at all times.

Still another object of this invention is to provide an independent floating gang implement attachment for tractors including features of improvement as to the construction and combination of parts, all to the end of affording a simplified, compact and durable structure which is relatively inexpensive to manufacture, assemble and service.

The construction and operation of apparatus embodying the invention will become readily apparent as the disclosure progresses and particularly points out additional objects and advantages of special importance. And accordingly, the present invention may be considered as comprising the various constructions, combinations, and/or subcombinations of parts as is hereinafter more fully set forth in the detailed description and appended claims, reference being had to the accompanying drawing illustrating but one embodiment of the invention, and in which:

Figure 1:
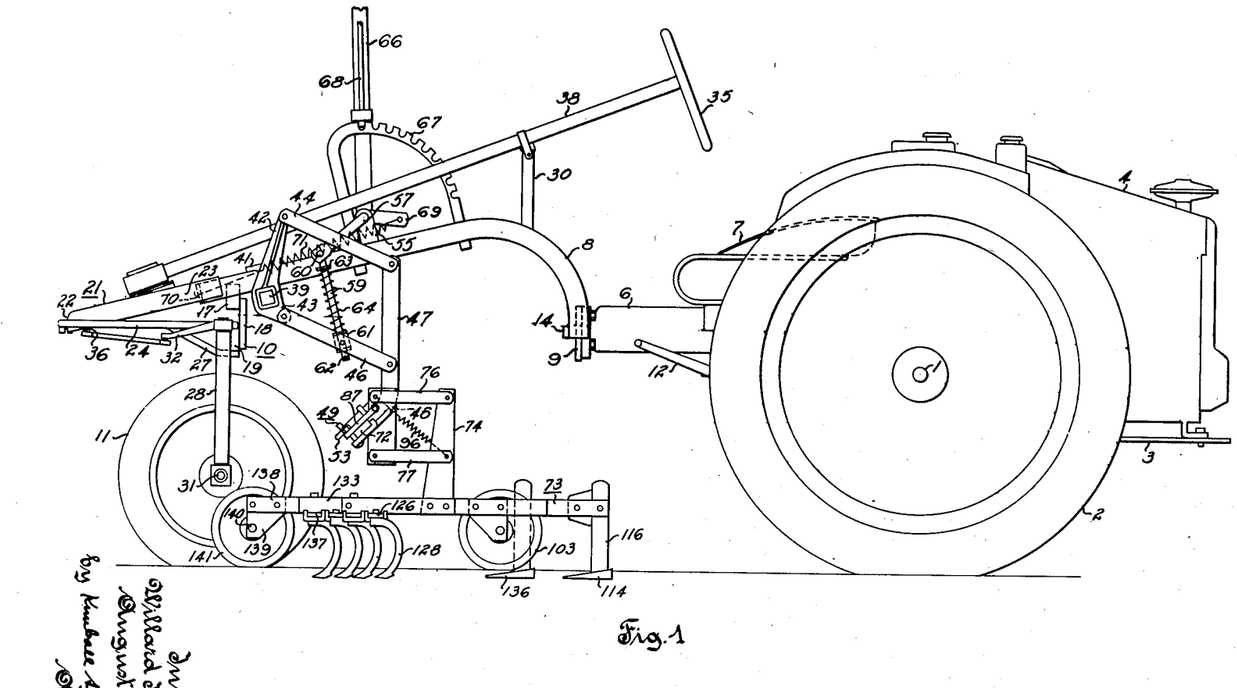
Fig. 1 is a side elevation of a tractor-implement combination with the near-side tractor front wheel removed.
Figures 2, 4, 5:
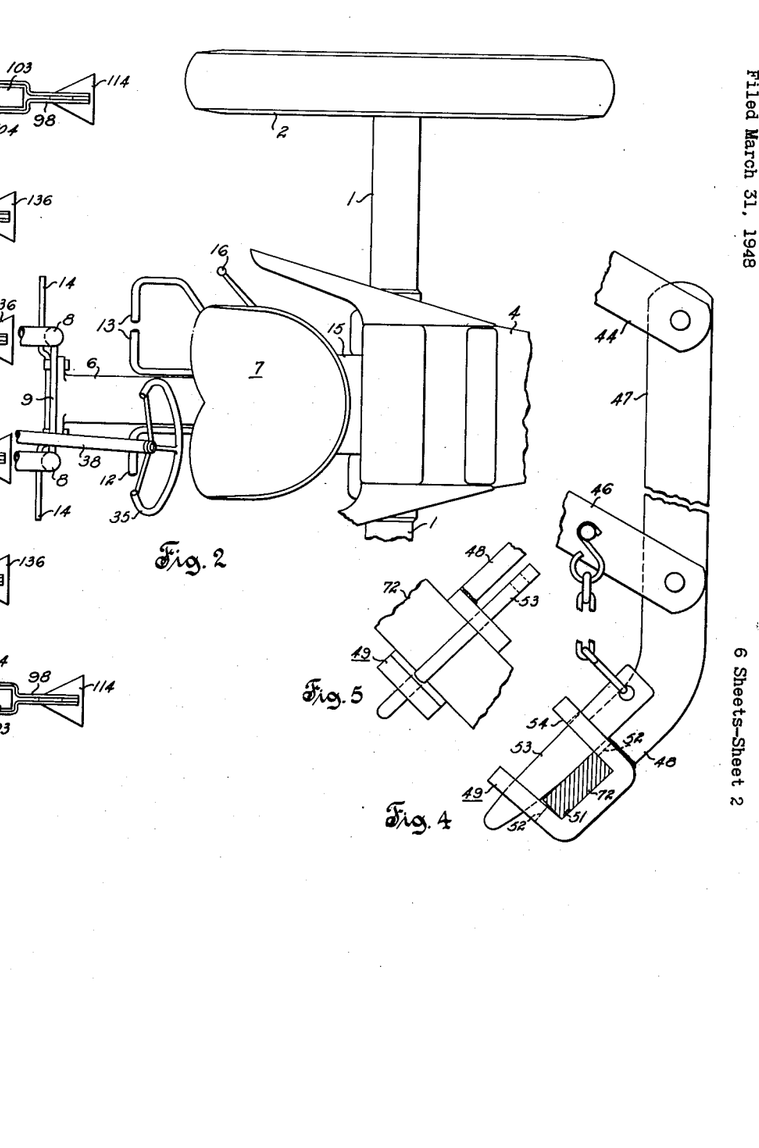
Fig. 2 is a plan view of the tractor-implement combination shown in Fig. 1 with parts broken away to better show the arrangement of the various elements.
Fig. 4 is an enlarged view of the detachable connection between the implement draft bar and the master tool lift connected therewith.
Fig. 5 is a plan view of the detachable connector shown in Fig. 4.
Figure 3:
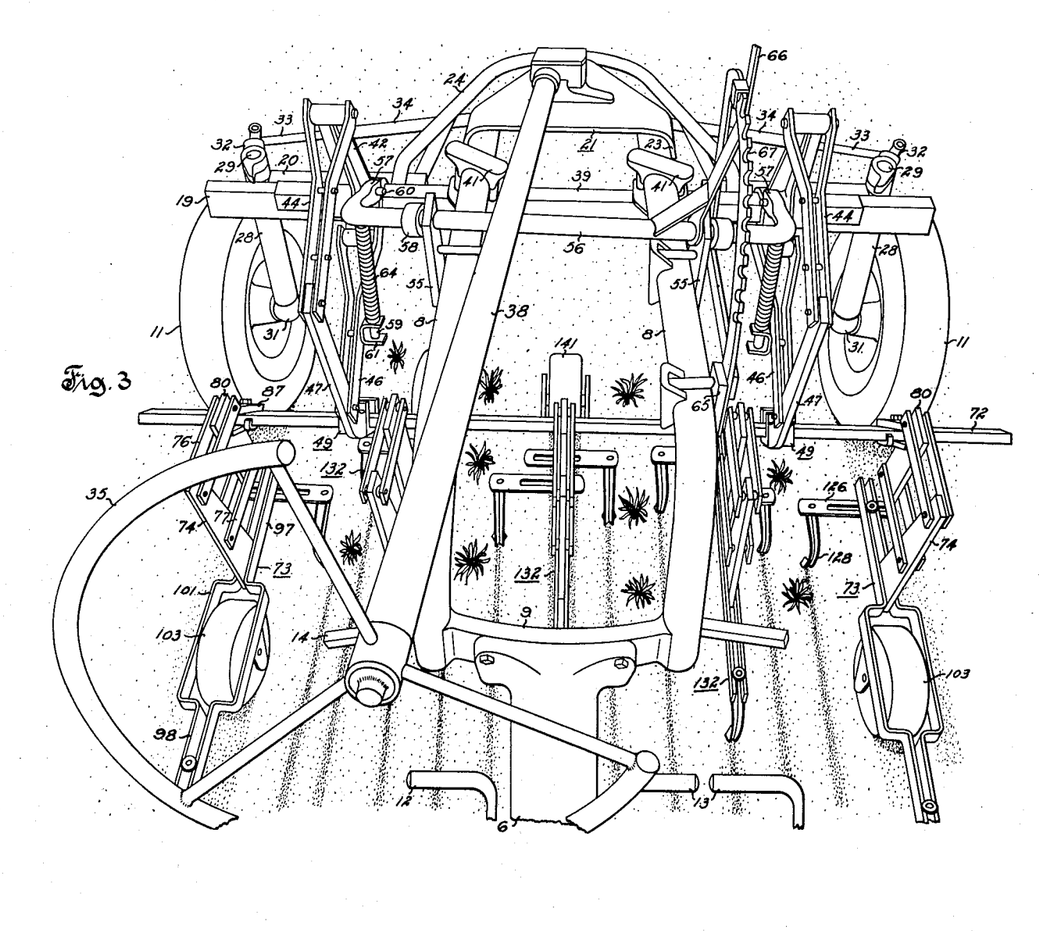
Fig. 3 is a view of the front portion of the tractor-implement combination shown in Figs. 1 and 2 as seen from the operator's station on the tractor.

Referring particularly to Figs. 1, 2 and 3, it will be seen that the tractor element of the combination comprises a rear axle structure 1 mounting a pair of laterally spaced ground engaging traction wheels 2 at opposite ends thereof, a rearwardly projecting frame part 3 mounting an engine 4 in rearwardly overhung relation with respect to axle structure 1, a forwardly extending tubular frame part 6 mounting an operator's seat or station 7 in elevated relation thereto and immediately in advance of engine 4, a pair of laterally spaced upwardly arched tubular frame members 8 having their rear ends rigidly united with a transverse part 9 which in turn is fixedly secured to the forward end of central frame part 6, and a transverse front axle structure 10 secured to forward end portions of tubular frame members 8 and supported on a pair of laterally spaced dirigible front front wheels 11. In this connection it should be noted that tubular frame members 8 are abruptly arched upwardly to a point of maximum height immediately in advance of frame part 6 and then extend gradually downward and forward to their points of connection with the front axle structure 10 to form a bifurcated open frame structure.

A clutch pedal 12 is disposed adjacent one side of tubular frame part 6 in convenient reach of the left foot of an operator seated at station 7 and a pair of brake pedals 13 are disposed adjacent the opposite side of frame part 6, these brake pedals being arranged for selective or simultaneous operation by the right foot of an operator seated at station 7. A foot rest 14 is secured to transverse part 9 and projects laterally beyond the opposite sides thereof as best indicated in Fig. 2. Engine 4 is operatively connected with rear axle structure 1 through suitable gearing enclosed in a transmission housing 15, and a gear shift lever 16 extends upward and forward to a point within easy reach of an operator seated at station 7. And in this connection, it is to be understood that engine 4 is provided with the usual operator actuated controls (not shown).

The front axle structure comprises a rigid transverse bar 17 extending between forward end portions of tubular frame members 8 with its opposite ends suitably secured in fixed bracing relation relative to said frame members, a rigid plate part 18 fixedly secured to a central portion of bar 17 in depending relation thereto, and a rigid transverse bar 19 fixedly secured in side abutting relation to a lower portion of plate 18, this bar projecting equal distances laterally to either side of tubular frame parts 8. The forward side of the opposite end portions of bar 19 are provided with similar side abutting bar members 20 detachably secured to bar 19 for selective adjustment longitudinally thereof so as to vary the tread width of the front wheels. The forward end portions of tubular frame members 8 are additionally braced by a rigid generally triangular shaped plate member 21 having its apex or forward end portion and also opposite side portions thereof turned down to form front and side walls 22 and 23, respectively, the rear end portions of walls 23 side abutting the forward end portions of tubular frame members 8 and being welded or otherwise fixedly secured thereto. Transverse bar 19 is also braced by a curved rod 24 having its mid portion swivel connected with the apex portion of plate member 21 as indicated by numeral 26 and having bifurcated opposite end portions 27 fixedly connected as by welding with the top and bottom edges of the outer portions of this bar.

The outer end of each bar member 20 rigidly mounts a depending vertical bearing or sleeve 28 which in turn rotatably supports a wheel standard 29 for pivotal movement about a vertical axis, the lower portion of each standard presenting a laterally extending spindle 31 rotatably mounting a front wheel 11. The upper end of each standard 29 is provided with a laterally extending arm 32 and each of these arms is link connected, preferably by a link comprising telescoping sections 33 and 34, with a steering arm 36 mounted on the lower end of a shaft 37 extending vertically upward through rigid plate 21 and having its upper end gear connected with a steering wheel shaft or tube 38, which is additionally supported adjacent its rear end by an upstanding bracket 30 on left side frame member 8. The steering wheel 35 at the rear end of shaft 38 is positioned within easy reach of an operator sitting at station 7 and it should be noted that the forward end of this shaft is positioned approximately at the longitudinal center line of the tractor and extends rearward in oblique relation to such line to thereby afford the operator a practically unrestricted view of the ground between frame members 8. And in this connection it should also be noted that a portion of the right side of steering wheel 35 has been cut away in the interest of bettering the operator's view.

A rigid transverse frame bar or cross bar 39 is secured to the underside of the forward portions of tubular frame members 8, immediately to the rear of triangular plate member 21, by means of suitable clamps 41. Bar 39 is generally parallel to the transverse axle bar 19 and preferably projects equal distances to either side of the frame members 8. A similar hanger member is fixedly secured on each end portion of bar 39 and presents an upwardly extending arm 42 and a depending arm 43, the upper arm of each hanger pivotally mounting a rearwardly extending fabricated link 44. The lower arm of each hanger also pivotally mounts a rearwardly extending fabricated link 46. The rear ends of upper and lower links 44 and 46, respectively, are pivotally connected with vertically spaced portions of a rigid link 47 which together with the hanger member 42, 43, link 44 and link 46 forms a link parallelogram. Rigid link 47 extends beneath lower link 46 and terminates in a forwardly projecting end portion 48 mounting a U-shaped part or support 49 presenting an upwardly facing base surface 51 (note Figs. 4 and 5) which is inclined downward and forward at an angle of approximately 45 degrees relative to the ground. Opposed upper portions of the sides of each U-shaped part 49 are provided with aligned generally rectangular openings 52 therethrough adapted to receive a tapered key 53 of generally rectangular configuration in cross section. Tapered key 53 is preferably attached by a chain or other suitable means to any convenient part of the link structure, for example, lower link 46, so as not to become lost when removed from part 49. As best shown in Fig. 4, the sides of U-shaped part 49 diverge upwardly a slight amount to facilitate insertion of a rectangular draft bar therebetween. And in addition it is to be understood that the laterally spaced hangers, one on each side of the tractor, are in transverse alignment relative to the longitudinal axis of the tractor, that the base surfaces 51 of parts 49 approximately coincide with a 45 degree plane passing therethrough and intersecting the ground in advance thereof, and that the rear side of each part 49 presents a forwardly facing plain surface 54 which is generally normal to base surface 51. Consequently the laterally spaced surfaces 51 and 54 presented by the parts 49 on each side of the tractor are in generally transverse alignment as is best shown in Figs. 1, 2 and 3. In addition it should be noted that the link mechanism just described positions support parts 49 in vertically spaced underslung relation with respect to lower links 46.

Referring again to Figs. 2 and 3, it will be seen that opposed portions of laterally spaced frame parts 8 detachably mount a pair of upwardly extending brackets 55 provided with transversely aligned journal portions rotatably supporting a transversely extending rock shaft 56. Opposite end portions of shaft 56 are similarly bent at a right angle to the longitudinal axis thereof to form crank or lift arms 57 positioned in forwardly and downwardly extending relation with respect to the main portion of this shaft and generally alongside the inner or tractor side of the adjacent upper link 44. Lateral movement of shaft 56 relative to brackets 55 is prevented by collars 58 mounted thereon adjacent the outer side of each bracket. The forward or free end of each lift arm 57 is pivotally connected with an intermediate portion of the adjacent lower link 46 by means of a rod 59 having an upper end 60 laterally offset and pivotally connected to the lift arm and having its lower end slidably extending through aligned openings in a bifurcated part 61 pivotally supported on the tractor side of link 46. The lower end of rod 59 is provided with a transverse pin 62 to prevent accidental removal of the rod from part 61 and the upper portion of this rod is provided with a surrounding spring seat 63. A compression spring 64 surrounds rod 59 with one end of this spring abutting seat 63 and with its opposite end abutting the upper side of part 61. An intermediate portion of rock shaft 56, preferably the portion immediately adjacent the bracket 55 supported on the right side of frame member 8, that is, on the right side of the tractor as viewed in Fig. 3, has fixed thereto a lever 66 which projects or extends upwardly alongside a notched quadrant 67 fixedly mounted on the adjacent frame member 8 as by means of a suitable bracket 65. Lever 66 mounts a quadrant engaging latch rod 68 and preferably has its upper portion (not shown) extending rearward to a point within easy reach of an operator seated at station 7. An intermediate portion of shaft 56 may be provided with a rearwardly extending arm 69 (note Fig. 1) having its free end connected with the rear end of a tension spring 71 which in turn has its forward end secured to a bracket 70 carried by the tractor in advance of and below the free end of arm 69 so as to aid the operator in effecting a lifting of the link mechanism carried by the hanger mounted on transverse bar 39.

As shown in Figs. 1 and 3, the lift arms 57 and therefore the links 44, 46, and 47 are in their lowermost position and it should be obvious that upon releasing quadrant latch bar 68 lever 66 may be moved rearward toward the operator's station to effect a clockwise turning movement of shaft 56 and a corresponding upward movement of lift arms 57 and rods 59, the latter moving upward relative to bufurcated part 61 until pin 62 engages the underside of this part. Further upward movement of rod 59 effects a corresponding upward movement of links 44, 46 and 47 and of the part 49 on the lower end of each link 47. Links 44 and 46 are approximately parallel and of equal length so that both parts 49 are moved upward or downward simultaneously at a right angle to level ground in response to a lifting or lowering movement of lever 66. The compression of spring 64 permits a downward movement of rod 59 relative to bifurcated part 61 in the event the downward movement of link 47 should be arrested before reaching the position to which it is being lowered by movement of lever 66. And it should now be obvious that the apparatus just described, and more particularly parts 49, may be considered as underslung vertically adjustable implement supports.

A relatively thin and rigid draft bar or member 72, generally rectangular in cross section, is mounted on supports 49 and positioned thereby to extend transversely of the tractor in underslung relation thereto with its narrow sides generally normal to a 45 degree plane passing therethrough and intersecting the ground in advance thereof. This positioning of the draft bar being attained by engagement of the adjoining normal surfaces 51 and 54 of parts 49 with the like surfaces presented by rectangular draft bar 72. This draft bar is rigidly secured in the position just described simply by inserting tapered keys 53 through the generally aligned holes 52 in parts 49, the underside of the keys firmly engaging the top surface presented by the draft bar. The keys 53 can be readily removed from parts 49 simply by tapping the forward end of the key with a hammer or other suitable tool whereupon the draft bar may be detached from or shifted relative to supports 49 as desired. Draft bar 72 is preferably mounted in symmetrical relation relative to the longitudinal axis of the tractor and may be of such length as to conform with the maximum tread spacing of the front wheels 11.

Figure 6:
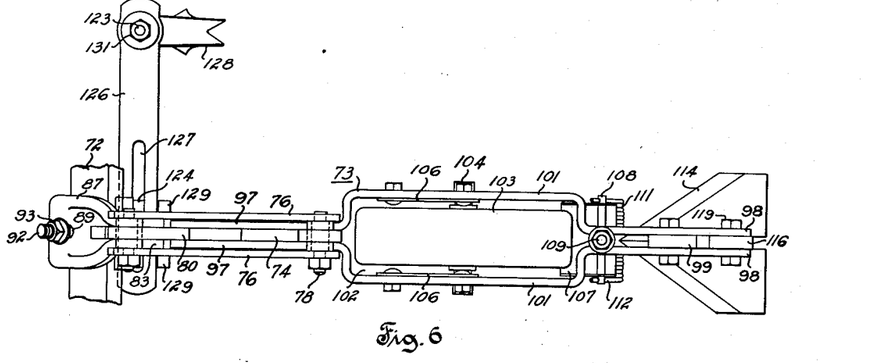
Fig. 6 is an enlarged plan view of one of the outer tool rigs shown in Fig. 1.
Figures 7, 8:
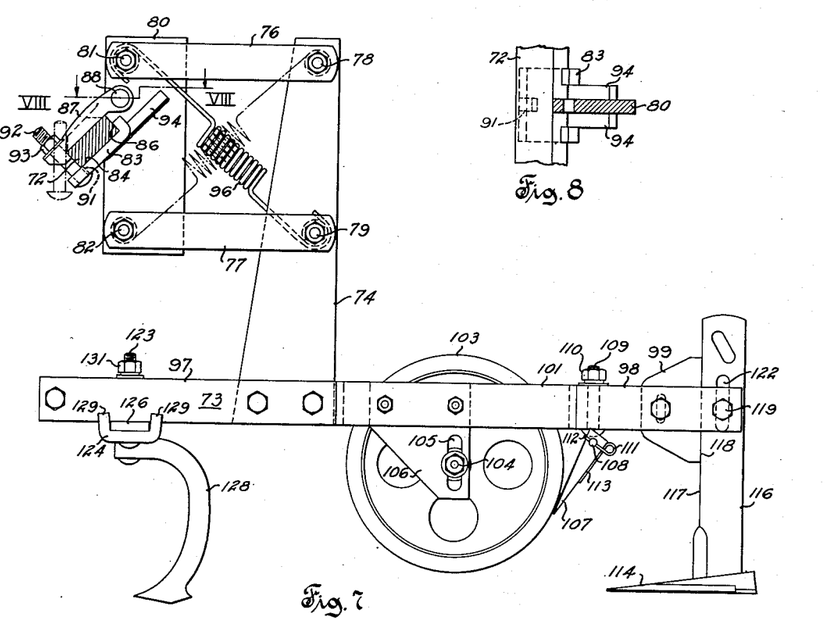
Fig. 7 is a side view of the tool rig shown in Fig. 6.
Fig. 8 is a view taken on line VIII—VIII of Fig. 7 with the hinged clamping part of the connector removed.

A plurality of tool rigs are detachably mounted on draft bar 72 for selective adjustment longitudinally thereof, Figs. 2 and 3, respectively, showing six and five tool rigs so mounted on the draft bar. Referring also to Figs. 6 and 7, it will be seen that each of the outer rigs, that is, those mounted directly behind the front wheels 11, comprises an elongated tool frame 73 having a rigid upstanding plate-like part 74 disposed intermediate the ends thereof, a pair of fabricated links 76 and 77 having their rear ends pivotally connected with vertically spaced portions 78 and 79 of part 74, and a rigid plate-like part 80 having vertically spaced pivot mountings 81 and 82 connected with and supporting the forward ends of links 76 and 77. These links are of substantially equal length and the vertical spacing of their points of pivotal connection with rigid parts 74 and 80 are preferably such as to form a parallel linkage. An intermediate portion of part 80, that is a portion intermediate the pivot mountings 81 and 82 is provided with a forwardly projecting connector having a fixed part 83 presenting adjoining draft bar receiving base and rear side surfaces 84 and 86 normal to each other and generally similar in arrangement to the base and rear side surfaces presented by draft bar supports 49, and having an overlying clamp part 87 supported on a pivot pin 88 disposed above and adjacent the rear end of part 83. The forward end of this clamp part is provided with an elongated bolt-receiving hole 89 therethrough. And the underlying forward end portion of part 83 is provided with a slot 91 therethrough which is open at its forward end and is aligned with the hole in clamp part 87 when the latter is swung into clamping relation with respect to a rectangular draft bar positioned on part 83. Rigid plate-like part 80 can be readily secured to draft bar 72 for movement therewith (assuming a bolt 92 is already inserted through hole 89 in clamp part 87 and retained therein by a nut 93 on the threaded upper end of the bolt) simply by positioning part 83 against the draft bar as shown in Fig. 7 and then swinging bolt 92 relative to part 87 and toward part 83 to position the lower shank end thereof in slot 91 with the head of the bolt engaging the underside of part 83 whereupon a tightening of nut 93 securely clamps the draft bar between connector parts 83 and 87.

When rigid part 80 is fixedly secured to draft bar 72 which is in turn fixedly secured to supports 49, it should be readily apparent that links 76 and 77 afford a vertical movement of rigid part 74 relative to part 80 and conversely that these links also afford a vertical movement of draft bar 72 and part 80 relative to part 74. It is desirable to permit a limited movement of draft bar 72 relative to part 74, as such movement, assuming the tool rig is resting on the ground, is effective to vary the line along which draft is transmitted through links 76 and 77 so that forward movement of the vehicle may act to pull tools carried by frame 73 either into or out of the ground, as desired. Stated differently, with the parts positioned as shown in Fig. 7, draft bar 72 and part 80 may be moved vertically relative to part 74 so that links 76 and 77 can be inclined either upward or downward relative to their pivot connections with part 74 thereby producing a vertical component of draft force which acts either upward or downward relative to a horizontal plane passing through the support for part 80, in this case the parts 49 and draft bar 72. However, the extent to which such support can be moved vertically upward relative to part 74 is necessarily limited since in order to effectively raise the tool rig or rigs by actuation of lever 66, the support therefor must be capable of picking up and lifting the rig or rigs clear of the ground a sufficient distance practical for all purposes of normal use. And in the construction herein shown, this is accomplished by providing rigid part 80 with a projection 94 (shown as an extension of the base portion of connector part 83) positioned to engage the underside of link 76 as draft bar 72 and part 80 are moved vertically upward a predetermined distance relative to part 74. Moreover, it is sometimes desirable to additionally vary the force exerted on the ground by the tool rig and this additional variation in press force, which force also acts to change the depth of tool penetration into the ground, can be readily attained by connecting a tension spring 96 diagonally across links 76 and 77 between pivot points 78 and 82 or between pivot points 79 and 81 to respectively effect an increase or a decrease in such force.

Each tool frame 73 is formed of bar stock and comprises a pair of similar bars having forward portions 97 fixedly bolted or otherwise secured to opposite sides of the lower portion of rigid plate-like part 74 in side abutting parallel relation thereto, having rear portions 98 which are longitudinally spaced from and aligned with front portions 97 and which are similarly fixedly secured to opposite sides of a plate-like spacer 99, and having intermediate portions 101 oppositely offset laterally to provide an enlarged generally rectangular space 102 therebetween. A gauge wheel 103 is disposed in rectangular space 102 formed between frame portions 101, this wheel being rotatably supported on a transverse bolt-like spindle or shaft 104 carried by a pair of depending plate-like hangers 106 bolted or otherwise secured to inner opposed sides of frame portions 101. Hangers 106 are provided with aligned vertical slots 105 therethrough receiving bolt-like shaft 104, the latter being vertically adjustable in slots 105 to thereby vertically vary the position of the gauge wheel relative to frame 73. Rear frame portions 98 carry a scraper blade 107 which is pivotally supported on a transverse pin 108 detachably clamped to the underside of frame portions 98, immediately to the rear of frame portions 101, by means of a bolt 109 which extends upward between frame portions 98 and is provided with nut 110 on the upper exposed threaded end thereof. A coil spring 111 extends across the rear underside of scraper blade 107, this spring having opposite ends 112 inserted through pin 108 adjacent the ends thereof and having an intermediate portion 113 engaging the underside of blade 107 so as to urge same against the rear side of wheel 103.

The rear frame portions 98 also mount a ground working tool 114 having an upstanding shank 116, rectangular in transverse cross section which is firmly clamped between frame portions 98 with its forward edge 117 abutting the vertical rear edge 118 of spacer 99. This clamping being effected by a bolt 119 which passes through aligned holes in frame portions 98 and through a hole 122 in shank 116, the last named hole being aligned elongated so as to afford a vertical adjustment of the tool relative to the frame. The forward frame portions 97 have detachably secured thereto in advance of part 80, as by means of a bolt 123 and a clamping part 124, one or more transverse tool bars 126 rectangular in transverse cross section and each having a longitudinal slot 127 therethrough affording adjustment of such bar or bars laterally relative to the longitudinal axis of frame 73. Each tool bar carries a depending ground working tool 128 and each clamping part 124 is provided with two pairs of similar upstanding diverging lugs 129 spaced apart a distance approximately equal to the width of tool bar 126, these pairs of lugs engaging opposite sides of frame portions 97 to prevent a lateral movement of the clamping part relative to the tool frame. The attaching bolt 123 passes through clamping part 124, through the slot 127 in tool bar 126 and upwardly between frame portions 97, the actual clamping being attained by tightening a nut 131 on the upper threaded end of this bolt.

Intermediate tool rigs, that is the rigs mounted on draft bar 72 between the two outer rigs, also comprise an elongated tool frame 132 having a rigid upstanding plate-like part which is identical to the corresponding part on tool frame 73 of each of the outer rigs as are also the parallel links and other parts connecting and supporting these parts on draft bar 72. And the same numerals have been used to designate these identical parts in the interest of simplicity. Tool frame 132 is formed of two similar pieces of bar stock 133 which are fixedly bolted or otherwise secured to opposite sides of the lower portion of plate-like part 74 in side abutting parallel relation thereto in the same manner as described with respect to tool frame 73. However, bars 133 extend to the rear of part 74 in uniformly spaced parallel relation as determined by the thickness of part 74 and by a spacer plate 134 of like thickness. The rear end of frame 132 mounts a ground working tool 136 having an upstanding shank, rectangular in transverse cross section, which may be adjustably secured between the rear end portions of bar 133 in the same manner as previously described with respect to the shank 116 of tool 114. Bars 133 also extend forwardly of part 74 in the above mentioned uniformly spaced parallel relation a distance sufficient to mount thereon a pair of laterally extending tool bars 137, these bars being generally similar in construction and mounting to the bars 126 on tool frame 73. The forward portions of frame bars 133 are oppositely laterally offset to form a bifurcated front end 138 which mounts a pair of depending hangers 139 which in turn adjustably support a gauge wheel 141. These hangers and the bolt-like shaft 140 mounting the gauge wheel therebetween are also similar to the corresponding parts on tool frame 73 and, therefore, a further description of these and other similar parts above mentioned are believed unnecessary for a complete understanding of the present invention.

From the foregoing description it should now be obvious that the tool rigs are separately detachably mounted on draft bar 72 for independent adjustment longitudinally thereof, that each rig includes a similar parallel link support (part 74, links 76 and 77, and a part 80) positioning the tool frame carried thereby to extend forwardly beneath the links and draft bar in generally parallel relation to the line of draft, and that these link supports afford pivot mountings permitting the tool frames carried thereby to float or swing vertically relative to draft bar 72 and independently of each other in conformity with variations in ground surface encountered by the gauge wheels mounted thereon. Referring to Fig. 3 it should be noted that the above mentioned construction and mounting including the provision of gauge wheels at the forward end of tool frames 132 and intermediate the ends of tool frames 73 positions tool mounting portions of frames 73 and 132, that is, portions of these frames in advance of rigid part 74, in transverse alignment and in plain close range view of an operator seated at station 7. In this connection it should be noted (see Fig. 2) that the tool bars 137 on frames 132 are positioned just in advance of draft bar 72 whereas the corresponding tool bars 126 on frames 73 are positioned directly beneath the draft bar. And while this same arrangement is also shown in Fig. 3, it should be obvious that if desired the tool bars 126 and 137 may be positioned on their respective frames in transverse alignment. In addition this construction and mounting affords an effective control as to rig mounting and tool arrangement and as to the depth of tool penetration such as will enable the operator to maintain the depth of tool penetration uniform, and if desired extremely shallow, at all times, which in turn permits operating a tractor implement of this type with the cultivating tools set extremely close to the plant rows.

Figures 10, 11:
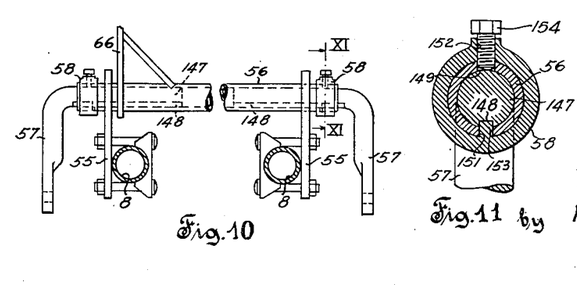
Fig. 10 is an enlarged view illustrating in detail a construction affording lateral adjustment of the implement support lift arms.
Fig. 11 is an enlarged section taken on line XI—XI of Fig. 10.

As heretofore described lift shaft 56, including arms 57, was considered as a unitary, one piece, structure. However, in arranging the tool rigs or tools to conform with bed and/or plant row spacing, it may be necessary or desirable to attach a rig or tool to the draft bar element 72 at the exact point or points at which such element is connected with the depending implement supports 49. Consequently, it is preferable to employ a lift shaft construction permitting the master tool carrier, that is the hangers comprising arms 42 and 43, links 44, 46 and 47, and supports 49, to be readily bodily adjusted longitudinally of transverse bar 39, as desired. And while the exact manner of attaching the hangers to rectangular cross bar 39 is not shown, it is to be understood that these hangers are fixedly clamped to bar 39 for adjustment longitudinally thereof, as desired, in a known or conventional manner. Referring to Figs. 10 and 11, it will be seen that the lift mechanism may include separable main shaft and lift arm elements 56 and 57, respectively. As shown, shaft element 56 is tubular and slidably receives therein the shaft portions 147 of similar lift arms 57, these shaft portions being provided with longitudinally aligned keyways 148. In addition, the opposite ends of tubular element 56 are each provided with a diametrically aligned hole and slot 149 and 151, respectively, the slots extending inward a short distance from each end of the tube in axial alignment with respect to each other. Collars 58 have an inside diameter conforming with the outside diameter of the opposite end portions of tubular shaft 56 so as to telescope thereover, each collar including an internally threaded hole 152 and a diametrically disposed inward projection or key part 153 positionable in the master keyway formed by the coaction of tube slot 149 and lift arm shaft keyway 148, the lift arms being secured in selected fixed relation to shaft 56 by the insertion of set screws 154, as best shown in Fig. 11. Therefore, all that has to be done in order to lengthen or shorten the effective length of the lift shaft is to loosen set screws 154 whereupon lift arms 57 may be slid into or out of tube shaft 56 simply by moving the master tool carriers, which are connected with arms 57 through rods 59, longitudinally of bar 39, as desired. And when such an adjustment has been made, all that remains to be done is to tighten set screws 154.

Figure 12:
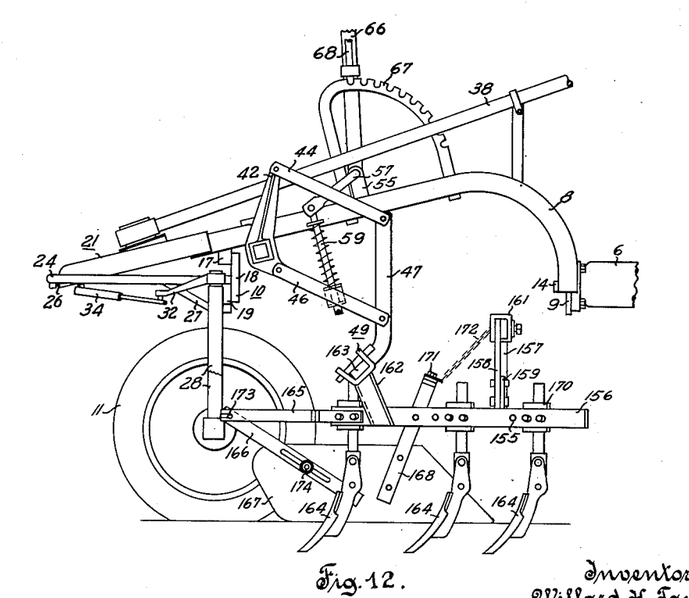
Fig. 12 is a partial view in side elevation of another tractor-implement combination with the rear side front wheel and the rear portion of the tractor omitted in the interest of clarity.
Figure 13:
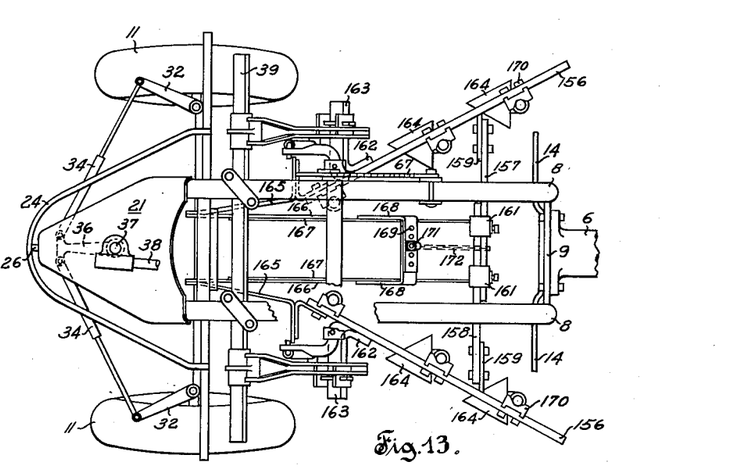
Fig. 13 is a plan view of the structure shown in Fig. 12 with parts broken away to better show the arrangement of various elements.

Referring to the tractor-implement combination shown in Figs. 12 and 13, it will be seen that the tractor and master tool carrier constructions are identical to those previously described. Therefore, the same reference numerals are used to designate the corresponding parts in the interest of clarity. However, as to the implement attachment, it will be noted that the implement frame comprises a pair of similar rigid bars 156 united in isoceles trapezoidal relation with respect to a pair of parallel vertical planes passing through opposed opposite end portions of the bars by means of an upwardly arched rigid brace formed by a pair of similar flat stock bars 157 and 158 having their lower end bolted or otherwise secured to upstanding brackets 159 on opposed rear end portions of tool bars 156 and having their other end portions adjustably clamped together in overlapping side-abutting relation through suitable connectors 161. Opposed forward portions of tool bars 156 are provided with rigid upstanding brackets 162 terminating in laterally spaced oppositely projecting draft bar elements 163 disposed in transverse alignment, these elements being rectangular in cross section and otherwise conforming with the dimensions of previously described draft bar element 72. And in this connection it should be understood that draft bar elements 163 are also positioned so that the narrow sides thereof are generally normal to a forty-five degree plane passing therethrough and intersecting the ground in advance thereof. Each tool bar 156 is provided with a longitudinal series of transverse holes 155 for selectively adjustably mounting one or more conventional type tools 164, the tool attaching connector 170 being also conventional. Therefore, a further description of this part of the construction is deemed unnecessary for a complete understanding of the present invention.

In addition, tool bars 156 are each provided with a generally similar forward extension 165 to which is attached, by means of a depending strap link 166, the forward end of a vertically disposed plant guard or shield 167. These guards extend rearward between tool bars 156 in laterally spaced generally parallel relation with respect to each and with respect to the longitudinal axis of the tractor, the rear end portions of these guards being united by an upwardly arched brace means comprising similar strap elements 168 which are riveted or otherwise fixedly secured to the guards and thereby positioned with their free ends disposed in overlapped side-abutting relation. The overlapping portion of strap elements 168 are provided with a series of alignable holes 169 through which a securing bolt or like means 171 may be inserted. This construction permits the lateral spacing of the plant guards to be adjusted in conformity with the lateral adjustment of tool bars 156 afforded by brace bars 157 and 158. A chain or other form of lost motion connector 172 unites the plant guard and tool bar brace means, the latter projecting upward a considerable distance above the former so as to afford a limited relative vertical movement of the tool bars, that is the implement frame, and plant guards. And in this connection, it should be noted that each strap link 166 has a pin and slot connection 173 with tool bar extension 165 and an adjustable slot and bolt connection 174 with the forward portion of the associated plant guard.

The construction of the implement just described, when considered in connection with the supports therefor, that is the master tool carrier and lift mechanism, minimizes the use of implement frame bracing means (only a single bracing means comprising overlapped bar elements 157 and 158 is employed for the frame proper), and thereby the weight and cost of the implement. In addition, the provision of draft bar elements such as herein disclosed further reduces weight and cost and affords a simplified support and attaching construction affording numerous obvious advantages.

Figure 9:
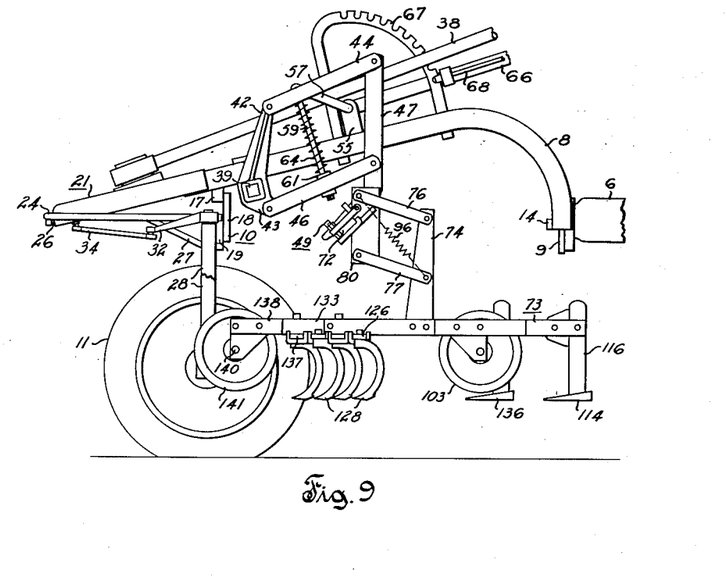
Fig. 9 is a partial view similar to Fig. 1 showing the lift mechanism and implements in fully raised position.

It should also be noted that the mounting, arrangement and relation of implement supports 49 and tractor frame members 6 and 8 are such that upon shifting lever 66 from the position shown in Fig. 1 to the position shown in Fig. 9, the parallel link support portions of tool rigs disposed directly beneath the tractor or the rear upstanding portion of the implement, shown in Figs. 12 and 13, move upward into the space afforded by the upwardly arched frame members 8. Consequently, one or more tool rigs may be mounted on draft bar 72 directly beneath the tractor and yet these rigs can be readily raised to a height above the ground sufficient for all practical purposes. And the same is true for other forms of implements mounted on supports 49 in underslung relation to the tractor as is obvious from a consideration of Figs. 12 and 13. In addition, the tool bars and rigs are readily accessible and ample space is afforded for the adjustment and/or removal of individual tools or rigs, as desired. Moreover, the overall dimensions and weight of an implement attachment constructed as herein disclosed are such that the operator can readily position the implement beneath the tractor for attaching same, or if detaching same, can readily pull the implement clear of the tractor. This permits a quick change of complete implements and is particularly desirable on large truck farms where it is of advantage to substitute complete implements rather than frequently adjust the tool rigs and/or the tools mounted thereon. Furthermore, it should now be obvious that irrespective of the particular type of implement, the underslung supports 49 position the implement draft bar element 72 with their narrow sides or edges generally normal to the line of vision of an operator seated at station 7 and looking forward toward the ground directly behind and between the tractor front wheels thereby affording the operator a substantially unrestricted close range view of the implement tools supportedly connected with the draft bar.

It should now be obvious that although the apparatus herein disclosed as embodying the invention has particular utility in the planting and cultivation of vegetable crops, certain features are of more general application and that, therefore, it is not intended to limit the invention to the exact constructions and combinations herein shown and described for purposes of illustration as various modifications within the scope of the appended claims may occur to persons skilled in the art.

It is claimed and desired to secure by Letters Patent:

1. The combination of a rear engine tractor including a rear axle structure supported on transversely spaced rear driving wheels forwardly of its engine and having a bifurcated open frame structure rigidly connected with and extending forwardly from said rear axle structure and sustained at its forward end on a dirigible front wheel support, a tool unit operatively connected with said bifurcated frame structure in underlying vertically adjustable relation thereto, and a mechanism for adjusting said tool unit selectively to raised inoperative and lowered operative positions, said adjusting mechanism including a rock shaft extending transversely across said bifurcated frame structure at a portion of the latter in proximity to said front wheel support, supporting brackets for said rock shaft detachably secured, respectively, to longitudinally extending transversely spaced side members of said frame structure, and motion transmitting means operatively interposed between said rock shaft and said tool unit at opposite sides, respectively, of said frame structure.

2. The combination of a rear engine tractor including a rear axle structure supported on transversely spaced rear driving wheels forwardly of its engine and having a bifurcated open frame structure rigidly connected with and extending forwardly from said rear axle structure and sustained at its forward end on a dirigible front wheel support, a tool unit operatively connected with said bifurcated frame structure in underlying vertically adjustable relation thereto, and a mechanism for adjusting said tool unit selectively to raised inoperative and lowered operative positions, said adjusting mechanism including a rock shaft extending transversely across said bifurcated frame structure at a portion of the latter in proximity to said front wheel support, supporting brackets for said rock shaft detachably secured, respectively, to longitudinally extending transversely spaced side members of said frame structure, a hand lever rigidly connected to said rock shaft to extend radially therefrom, a quadrant for said hand lever detachably secured to one of said side members and adjacent to said rock shaft, latching means operatively interposed between said hand lever and said quadrant for selectively securing said hand lever in different rotatively adjusted positions relative to said quadrant, and motion transmitting means operatively interposed between said rock shaft and said tool unit at opposite sides, respectively, of said frame structure.

3. The combination of a rear engine tractor including a rear axle structure supported on transversely spaced rear driving wheels forwardly of its engine and having a bifurcated open frame structure rigidly connected with and extending forwardly from said rear axle structure and sustained at its forward end on a dirigible front wheel support, and an implement attachment comprising a frame bar extending transversely across horizontally spaced, longitudinally extending side members of said bifurcated frame structure in proximity to said front wheel support; detachable clamp means rigidly connecting said frame bar with said side members, respectively; a pair of link parallelograms connected to said frame bar at opposite sides, respectively, of said bifurcated frame structure, each of said parallelograms including a hanger member rigidly mounted on said frame bar, a pair of upper and lower links pivotally connected to said hanger member and extending rearwardly therefrom, and a rear standard having vertically spaced portions pivotally connected, respectively, to rear portions of said links; and an up and down adjustable implement draft bar rigidly secured to lower portions of said rear standards in transversely extending, underlying relation to said bifurcated frame structure.

4. The combination of a rear engine tractor including a rear axle structure supported on transversely spaced rear driving wheels forwardly of its engine and having a bifurcated open frame structure rigidly connected with and extending forwardly from said rear axle structure and sustained at its forward end on a dirigible front wheel support, an attachment frame bar extending transversely across horizontally spaced, longitudinally extending side members of said bifurcated frame structure in proximity to said front wheel support, detachable clamp means rigidly connecting said frame bar with said side members, respectively; a pair of link parallelograms connected to said frame bar at opposite sides, respectively, of said bifurcated frame structure, each of said parallelograms including a hanger member rigidly mounted on said frame bar, a pair of upper and lower links pivotally connected to said hanger member and extending rearwardly therefrom, and a rear standard having vertically spaced portions pivotally connected, respectively, to rear portions of said links; at least one longitudinally extending tool mounting frame fixedly secured to lower portions of said rear standards in underlying relation to said bifurcated frame structure; and a plurality of ground engaging tools mounted on longitudinally spaced portions, respectively, of said tool mounting frame for vertical movement in unison therewith relative to said bifurcated frame structure.

5. The combination of a rear engine tractor including a rear axle structure supported on transversely spaced rear driving wheels forwardly of its engine and having a bifurcated open frame structure rigidly connected with and extending forwardly from said rear axle structure and sustained at its forward end on a dirigible front wheel support, an attachment frame bar extending transversely across horizontally spaced longitudinally extending side members of said bifurcated frame structure in proximity to said front wheel support; detachable clamp means rigidly connecting said frame bar with said side members, respectively; a pair of link parallelograms connected to said frame bar at opposite sides, respectively, of said bifurcated frame structure, each of said parallelograms including a hanger member rigidly mounted on said frame bar, a pair of upper and lower links pivotally connected to said hanger member and extending rearwardly therefrom, and a rear standard having vertically spaced portions pivotally connected, respectively, to rear portions of said links; an implement draft bar rigidly secured to lower portions of said rear standards in transversely extending, underlying relation to said bifurcated frame structure; a plurality of tool rigs each including an elongated tool mounting frame and a plurality of tools mounted on longitudinally spaced portions, respectively, of said tool frame; and link parallelograms operatively connecting said tool frames, respectively, with said draft bar for up and down swinging movement relative thereto and independently of each other.

6. The combination set forth in claim 5 wherein a pair of dirigible tractor front wheels are widely spaced apart for straddle row operation; in which two of said tool frames are disposed, respectively, adjacent to and in tracking relation to said tractor front wheels; and in which the remaining tool frames extend forwardly from said implement draft bar into the space between said tractor front wheels.

7. The combination set forth in claim 6 and further comprising a gauge wheel for each of said tool frames, means mounting the gauge wheels of said tracking tool frames in rearwardly spaced relation to said implement draft bar, and means mounting the gauge wheels of the remaining tool frames in forwardly spaced relation to said implement draft bar.

8. The combination of a rear engine tractor including a rear axle structure supported on transversely spaced rear driving wheels forwardly of its engine and having a bifurcated open frame structure rigidly connected with and extending forwardly from said rear axle structure and sustained at its forward end on a dirigible front wheel support, and an implement attachment comprising a frame bar extending transversely across horizontally spaced, longitudinally extending side members of said bifurcated frame structure in proximity to said front wheel support, detachable clamp means rigidly connecting said frame bar with said side members, respectively; a pair of link parallelograms connected to said frame bar at opposite sides, respectively, of said bifurcated frame structure, each of said parallelograms including a hanger member rigidly mounted on said frame bar, a pair of upper and lower links pivotally connected to said hanger member and extending rearwardly therefrom, and a rear standard having vertically spaced portions pivotally connected, respectively, to rear portions of said links; an implement draft bar rigidly secured to lower portions of said rear standards in transversely extending, underlying relation to said bifurcated frame structure; and a mechanism for adjusting said link parallelograms selectively between implement raised and implement lowered positions, said adjusting mechanism including a rock shaft extending transversely across said bifurcated frame structure rearwardly of said frame bar, supporting brackets for said rock shaft detachably secured, respectively, to said side members of said bifurcated frame structure, and motion transmitting means operatively interposed between said rock shaft and said link parallelograms.

References Cited in the file of this patent

UNITED STATES PATENTS

| Number | Name | Date |
| --- | --- | --- |
| 1,566,229 | Scanlan | Dec. 15, 1925 |
| 1,850,717 | Heitshu | Mar. 22, 1932 |
| 1,886,691 | Johnson | Nov. 8, 1932 |
| 1,946,403 | Johnson | Feb. 6, 1934 |
| 1,946,664 | Benjamin | Feb. 13, 1934 |
| 2,152,212 | Reinkens | Mar. 28, 1939 |
| 2,228,172 | Luttichau | Jan. 7, 1941 |
| 2,287,438 | Lindsay | June 23, 1942 |
| 2,318,205 | Drennan | May 4, 1943 |
| 2,349,343 | Graham | May 23, 1944 |
| 2,357,849 | Ray | Sept. 12, 1944 |
| 2,378,615 | Brown | June 19, 1945 |
| 2,416,189 | McIntyre | Feb. 18, 1947 |
| 2,580,480 | Strehlow et al. | Jan. 1, 1952 |

FOREIGN PATENTS

| Number | Country | Date |
| --- | --- | --- |
| 49,581 | Germany | Nov. 13, 1889 |